United States Patent
Park et al.

(10) Patent No.: US 8,939,614 B2
(45) Date of Patent: Jan. 27, 2015

(54) LIGHT GUIDE PANEL AND APPARATUS FOR FORMING PATTERN ON LIGHT GUIDE PANEL

(75) Inventors: Deukil Park, Hwaseong-si (KR); Choongyop Rhew, Suwon-si (KR); Kiyong Baek, Pyeongtaek-si (KR); Daisoung Park, Hongchun-gun (KR)

(73) Assignee: HB Technology Co., Ltd., Asan-si (KR)

( * ) Notice: Subject to any disclaimer, the term of this patent is extended or adjusted under 35 U.S.C. 154(b) by 1115 days.

(21) Appl. No.: 12/922,890

(22) PCT Filed: Apr. 10, 2008

(86) PCT No.: PCT/KR2008/002026
§ 371 (c)(1), (2), (4) Date: Sep. 16, 2010

(87) PCT Pub. No.: WO2009/125881
PCT Pub. Date: Oct. 15, 2009

(65) Prior Publication Data
US 2011/0013168 A1    Jan. 20, 2011

(51) Int. Cl.
*F21V 5/00* (2006.01)
*F21V 8/00* (2006.01)
*G02F 1/13* (2006.01)

(52) U.S. Cl.
CPC ............ *G02B 6/0036* (2013.01); *G02B 6/0065* (2013.01); *G02F 1/1303* (2013.01); *G02B 6/0061* (2013.01)
USPC ........................................ 362/331; 362/602

(58) Field of Classification Search
USPC ................................. 362/331, 602
See application file for complete search history.

(56) References Cited

U.S. PATENT DOCUMENTS

2003/0210539 A1    11/2003   Park et al.
2004/0105157 A1*    6/2004   Matsushita et al. ........... 359/584

FOREIGN PATENT DOCUMENTS

| JP | 2004-102088 | 4/2004 |
| JP | 2006-168260 | 6/2006 |
| KR | 10-2006-0042807 | 5/2006 |
| KR | 10-2006-0091843 | 8/2006 |
| KR | 10-2006-0091849 | 8/2006 |
| KR | 10-2006-0091879 | 8/2006 |

OTHER PUBLICATIONS

International Search Report for PCT/KR2008/002026 dated Dec. 29, 2008 (2 pages).

* cited by examiner

*Primary Examiner* — Mary Ellen Bowman
(74) *Attorney, Agent, or Firm* — NSIP Law

(57) ABSTRACT

A pattern forming apparatus for a light guide panel is provided. The apparatus may include a pattern design system, a control system, a header moving unit including an XY moving unit and a header unit, a laser system, beam splitters, and an optical unit. The pattern design system may have an input of data on a pattern. The control system may connect with the pattern design system and transmits a position signal. The XY moving unit may mechanically move up/down and left/right in response to the position signal. The header unit may be coupled with the XY moving unit and reflects a scanned laser beam. The laser system may output a laser beam by a pulse signal. The beam splitters may split a laser beam into two or more laser beams. The optical unit may reflect and collect the two or more laser beams.

10 Claims, 8 Drawing Sheets

LIGHT GUIDE PANEL AND APPARATUS FOR FORMING PATTERN ON LIGHT GUIDE PANEL

CROSS-REFERENCE TO RELATED APPLICATION(S)

This application is a National Stage entry of International Patent Application No. PCT/KR2008/002026, filed on Apr. 10, 2008, the entire disclosure of which is incorporated herein by reference for all purposes.

BACKGROUND

1. Field

The following description relates to an apparatus for forming a pattern on a light guide panel that is used for a backlight of a Liquid Crystal Display (LCD), a keypad, a phone, an illuminating surface light source, etc. More particularly, the following description relates to a pattern forming apparatus for forming a light guide pattern by splitting a laser beam into several ones to create a plurality of collected laser beams and scanning the laser beams using a header moving unit movable up/down and left/right, and a light guide panel manufactured using the same.

2. Description of Related Art

In general, a light guide panel is a plate providing a path for uniformly scattering and diffusing light scanned from a light source. The light guide panel is applied to a light receiving flat panel display such as an LCD or a surface light source device for an illuminating signboard, etc.

The surface light source device using the light guide panel is widely using a method of arranging a Cold Cathode Fluorescent Lamp (CCFL) or a Light Emitting Diode (LED) is widely used. This surface light source device is disclosed in Korean Patent Application Nos. 1994-33115, 2001-25870, 2001-53844, 2002-223, 2002-289, 2003-034, 2004-73443, 2005-, 2006-321, 2006-207, etc.

FIG. 1 is a cross section schematically illustrating a surface light source device according to the conventional art.

Referring to FIG. 1, the surface light source device 10 includes a light guide panel 11, a reflection panel 12 installed below the light guide panel 11, a light source 13 installed at a sidewall of the light guide panel 11, and a cover member 14 covering the light source 13.

The light source 13 can be a CCFL, an LED, etc.

A plurality of light guide pattern parts 15 are formed in the light guide panel 11 through printing using titanium oxide ($TiO_2$) having a bead shape and ink including glass, acryl, etc. to scatter and diffuse light incident on one surface of a transparent acryl resin.

In the above-constructed surface light source device 10, light irradiated from the light source 13 is incident on the light guide panel 11, the incident light is guided through the light guide panel 11 as indicated by an arrow, and then the light is reflected by the reflection panel 21 and the light guide pattern part 15 to have a relatively uniform intensity of illumination at each portion.

However, the light guide pattern part 15 formed in a print method has the following drawbacks.

Processes of manufacturing and printing of ink for forming the light guide pattern part 15 are very complicated and a defective ratio of removing or smearing part of a printed portion is very high.

This leads to a low yield of about 80% to 90% of the light guide pattern part 15. Also, because the light guide panel 11 using the print method cannot be reused after a print pattern is removed, the light guide panel 11 cannot be recycled, thus causing pollution. Thus, the light guide panel 11 is not environment-friendly.

Particularly, since the light guide pattern part 15 uses optical reflection of a printed ink object itself, the ink object itself unavoidably absorbs light. This light absorption phenomenon deteriorates the efficiency of light of the surface light source device.

In order to solve the above problems, a non-print method is applied. As the non-print method, there can be an injection molding method using a metal mold.

In the injection molding method, the metal mold 51 has to be repeatedly modified more than dozens of times for pattern optimization. Thus, there is a disadvantage of increasing a cost of development. As a period of time of manufacturing the metal mold 51 increases, it is difficult for a product model to satisfy a suddenly changing demand for development. If a product has a thick thickness, a time of cooling after injection increases to several minutes, thus deteriorating productivity. On the contrary, if a product has a very thin thickness and a wide area, it makes injection imperfect, thus causing a defect such as pattern non-formation.

In order to solve the above problem, there is provided a method for processing a light guide pattern part using a laser. In the case of using the laser, the light guide pattern part can be processed to a desired size without being affected by a deviation of a material thickness and a supplementary device such as a metal mold or a mask is not required. Also, because a light guide pattern is not coated with a separate material, the light guide pattern is recyclable and environment-friendly. However, the method has a disadvantage that a process time increases, so productivity decreases because all patterns have to be molded through a laser process one by one at one time.

Accordingly, embodiments are directed to a light guide panel and an apparatus for forming a pattern on the light guide panel that substantially obviate one or more of the problems due to limitations and disadvantages of the related art.

An object of embodiments is to provide a pattern forming apparatus for a light guide panel, for simultaneously processing a plurality of patterns on the light guide panel.

SUMMARY

To achieve these and other advantages and in accordance with the purpose of embodiments, as broadly described, there is provided a pattern forming apparatus for a light guide panel, for forming a plurality of patterned light guide pattern parts on the light guide panel. The apparatus includes a pattern design system, a control system, a header moving unit including an XY moving unit and a header unit, a laser system, one or more beam splitters, and an optical unit. The pattern design system has an input of data on a pattern to be formed in the light guide panel. The control system connects with the pattern design system and transmits a position signal corresponding to a coordinate value of each pattern to be formed in the light guide panel. The XY moving unit mechanically moves up/down and left/right in response to the position signal received from the control system. The header unit is coupled with the XY moving unit and reflects a laser beam scanned from a laser system to the light guide panel. The laser system outputs a laser beam by a pulse signal synchronized with an operation of the header moving unit. The one or more beam splitters are positioned within the header unit and split a laser beam, which is outputted from the laser system and passes through the header moving unit, into two or more laser beams. The optical unit reflects and collects the two or more laser beams split in the beam splitters. The two or more laser beams simultaneously outputted from the optical unit each are collected as multi-focus beams at a distance on a process surface of the light guide panel.

According to another aspect, there is provided a pattern forming apparatus for a light guide panel, for forming a plurality of patterned light guide pattern parts on the light guide panel. The apparatus includes a pattern design system, a control system, two or more header moving units including XY moving units and header units, two or more laser systems, beam splitters, and optical units. The pattern design system has an input of data on a pattern to be formed in the light guide panel. The control system connects with the pattern design system and divides a position signal corresponding to a coordinate value of each pattern to be formed in the light guide panel into two or more signals for transmission. The XY moving units each mechanically move up/down and left/right in response to the position signal received from the control system. The header units each are coupled with the XY moving units and reflect laser beams scanned from two or more laser systems to the light guide panel. The two or more laser systems output laser beams by pulse signals synchronized with operations of the header moving units. The beam splitters each are positioned within the two or more header moving unit and split the laser beams, which are outputted from the laser systems and pass through the header moving units, into two or more laser beams. The optical units each are positioned within the two or more header moving units and reflect and collect the two or more laser beams split in the beam splitters. The four or more laser beams each simultaneously outputted from the optical units each are collected as multi-focus beams at a distance on a process surface of the light guide panel.

The light guide pattern part formed in the light guide panel may be of a combination of grooves of a dot pair of two or more dots, a dotted line pair of two or more dotted lines, or a straight line pair of two or more straight lines.

The apparatus may further include a vacuum unit installed on a lower surface of the light guide panel and preventing the light guide panel from being warped by local heating of the laser beam.

The apparatus may further include an exhaust unit installed on an upper surface of the light guide panel and removing smoke generated while the light guide pattern part is formed in the light guide panel.

The light guide pattern part may be formed such that a length of each groove pair gradually increases as being far from the light source.

The light guide pattern part may be formed such that a pitch between respective groove pairs gradually decreases as being far from the light source.

The light guide pattern part may be formed such that, as being far from the light source, a length of each groove pair gradually increases and a pitch between respective groove pairs gradually decreases.

The light guide pattern part may be formed such that a width between respective groove pairs gradually decreases as being far from the light source.

The light guide pattern part may be formed in combination such that, as being far from the light source, a length of each groove pair gradually increases, a pitch between respective groove pairs gradually decreases, or a width between respective groove pairs gradually decreases.

The apparatus may further include an optical unit control unit for controlling the optical unit according to an optical unit control signal delivered from the control system such that a distance between focuses of the laser beams forming a groove pair can vary depending on a process position on the light guide panel.

According to another aspect, there is provided a light guide panel having a plurality of patterned light guide pattern part on one surface. The light guide pattern part is of a combination of grooves of a dot pair of two or more dots, a dotted line pair of two or more dotted lines, or a straight line pair of two or more straight lines.

The light guide pattern part may be formed such that a width between respective groove pairs gradually decreases as being far from the light source.

The light guide pattern part may be formed in combination such that, as being far from the light source, a length of each groove pair gradually increases, a pitch between respective groove pairs gradually decreases, or a width between respective groove pairs gradually decreases.

The apparatus may further include an optical unit control unit for controlling the optical unit according to an optical unit control signal delivered from the control system such that a distance between focuses of the laser beams forming a groove pair can vary depending on a process position on the light guide panel.

According to an embodiment, a plurality of patterns can be simultaneously processed on a light guide panel by splitting a laser beam into a plurality of ones using an optical construction, concentrating each split laser beam into an optical unit to create a multiple laser beam, and then collecting a plurality of the created laser beams as multi-focus beams on a process surface of the light guide panel.

Other features and aspects may be apparent from the following detailed description, the drawings, and the claims.

Figure 1:
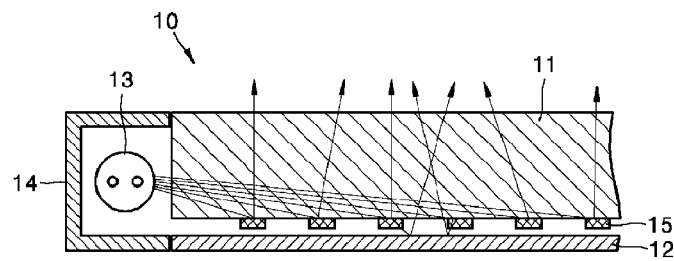
FIG. 1 is a cross section schematically illustrating a surface light source device according to the conventional art.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Hereinafter, the following description is made with reference to the accompanying drawings.

Figure 2:
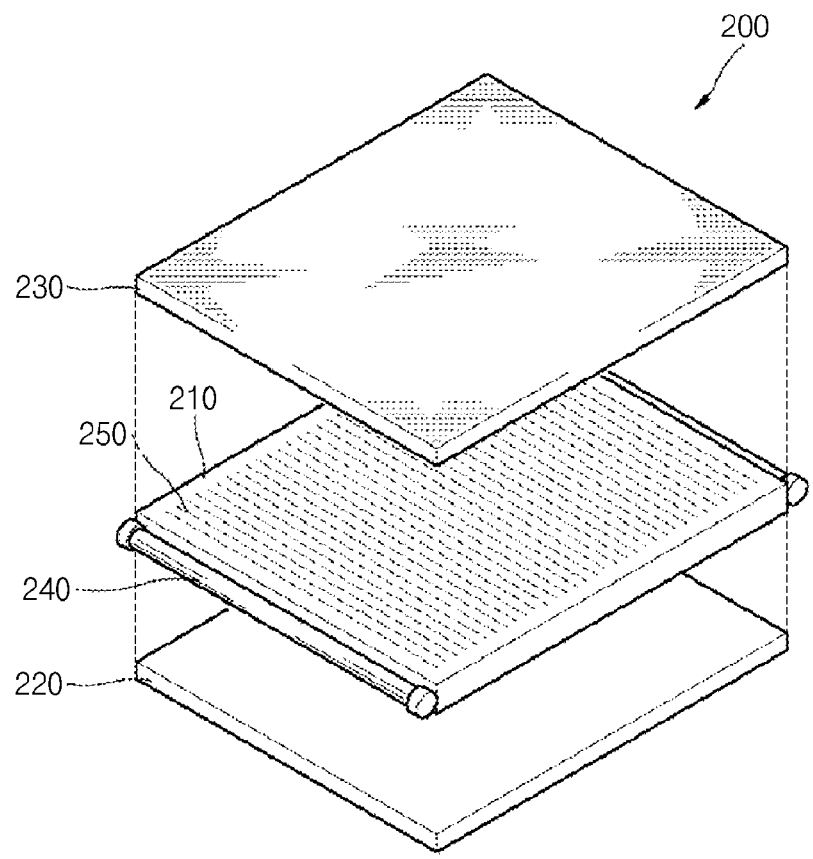
FIG. 2 is an exploded perspective diagram illustrating a surface light source device applying a light guide panel according to an example embodiment.

FIG. 2 is an exploded perspective diagram illustrating a surface light source device applying a light guide panel according to an example embodiment.

Referring to FIG. 2, the surface light source device 200 includes a light guide panel 210. A light guide pattern part 250 is formed on a lower surface of the light guide panel 210. A reflection panel 220 is installed below the light guide panel 210 to reflect an incident light upward. At least one light source 240 is installed at a sidewall of the light guide panel 210 to scan light toward the light guide panel 210. A diffusion panel 230 is further installed above the light guide panel 210 to scatter and diffuse light.

Light emitted from the light source 240 is incident on a side surface of the light guide panel 210. The light incident on the light guide panel 210 is guided and traveled in the light guide panel 210 by the total reflection effect. Among the guided light, light reaching a light guide pattern is emitted outside the light guide panel 210 by an incident angle more than a total reflection threshold angle. The light emitted from the light guide pattern again passes through the light guide panel 210 via the reflection panel 220, passes through the diffusion panel 230 on an upper surface of the light guide panel, and then is radiated to the front. The light guide pattern part 250 is arranged to have a low density at a portion close to the light source 240 and have a high density at a portion far from the light source 240, thus forming a uniform surface light source.

Figure 3:
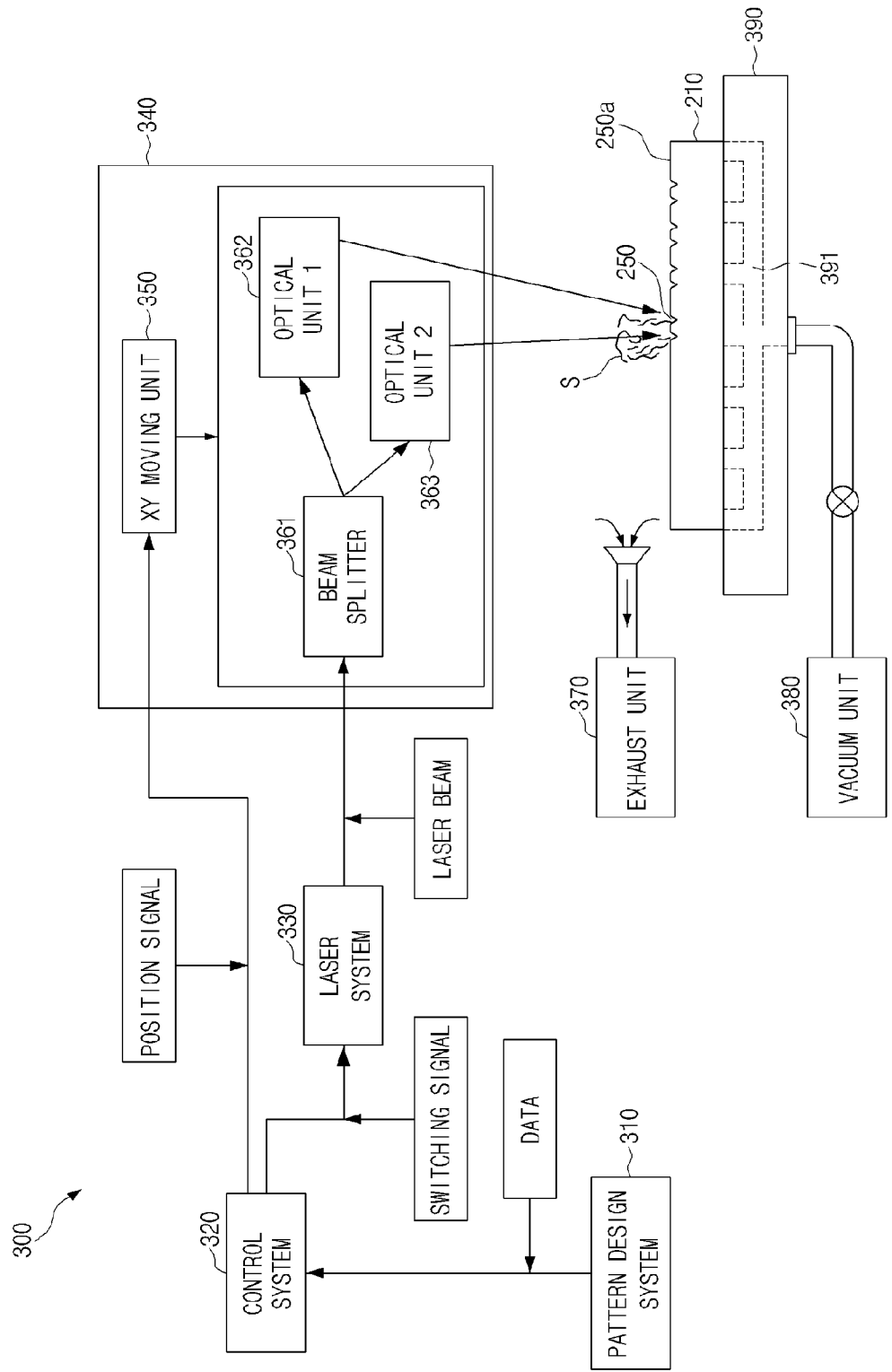
FIG. 3 is a diagram illustrating a construction of a pattern forming apparatus for forming a light guide pattern part on a light guide panel according to a first example embodiment.

FIG. 3 is a diagram illustrating a construction of a pattern forming apparatus 300 for forming a light guide pattern part on a light guide panel according to a first example embodiment. The pattern forming apparatus 300 includes a pattern design system 310, a control system 320, a laser system 330, a header moving unit 340, an exhaust unit 370, a vacuum unit 380, and warp prevention units 380 and 391 for preventing warp of the light guide panel 210.

The header moving unit 340 includes an XY moving unit 350 mechanically movable in an XY direction and a header unit 360 coupled with the XY moving unit 350 and reflecting a laser beam scanned from the laser system 330 to the light guide panel 210. The header unit 360 includes a beam splitter 361 for splitting a laser beam into two or more beams and optical units 362 and 363 that include a mirror unit (a reference numeral 362 of FIG. 4) and a lens (a reference numeral 406 of FIG. 4) to reflect and collect the split laser beams at a desired angle.

Referring to FIG. 3, the light guide panel 210 is mounted on a plate 390. A surface 250a of the light guide panel 210 on which the light guide pattern part 250 is to be formed is positioned to face the header moving unit 340 scanning a laser beam. In the light guide panel 210, each pattern 250 of the light guide pattern part 250 can be formed by scanning a laser beam using the laser system 330. A laser beam from one laser system 330 is split into two or more ones through the beam splitter 361 and is again reflected and collected. If one beam splitter 361 is provided, the beam splitter 361 can split a laser beam into two ones. If two beam splitters 361 are provided, the beam splitters 361 can split a laser beam into up to three ones. If desired, the split beams are reflected at a required angle by the mirror (reference numeral 362 of FIG. 4) and the thus reflected beams are again made as laser beam spots having desired diameters using the lens (reference numeral 406 of FIG. 4). At this time, the laser beam is scanned as the header unit 360 having the beam splitter 361, the mirror unit 362, and the lens unit 406 moves in an XY direction using the XY moving unit 350. The XY moving unit 350 moves the header unit 360 by receiving a position signal from the control system 320 and driving a guide rail in the XY direction. At this time, the laser system 330 receives a switching signal synchronized with the position signal from the control system 320 and outputs a laser beam. The outputted laser beam travels up to the header unit 360 of the header moving unit 340 and is split and collected in the header unit 360 and then is outputted to the light guide panel 210.

The header moving unit 340 is described below in detail.

Figure 4:
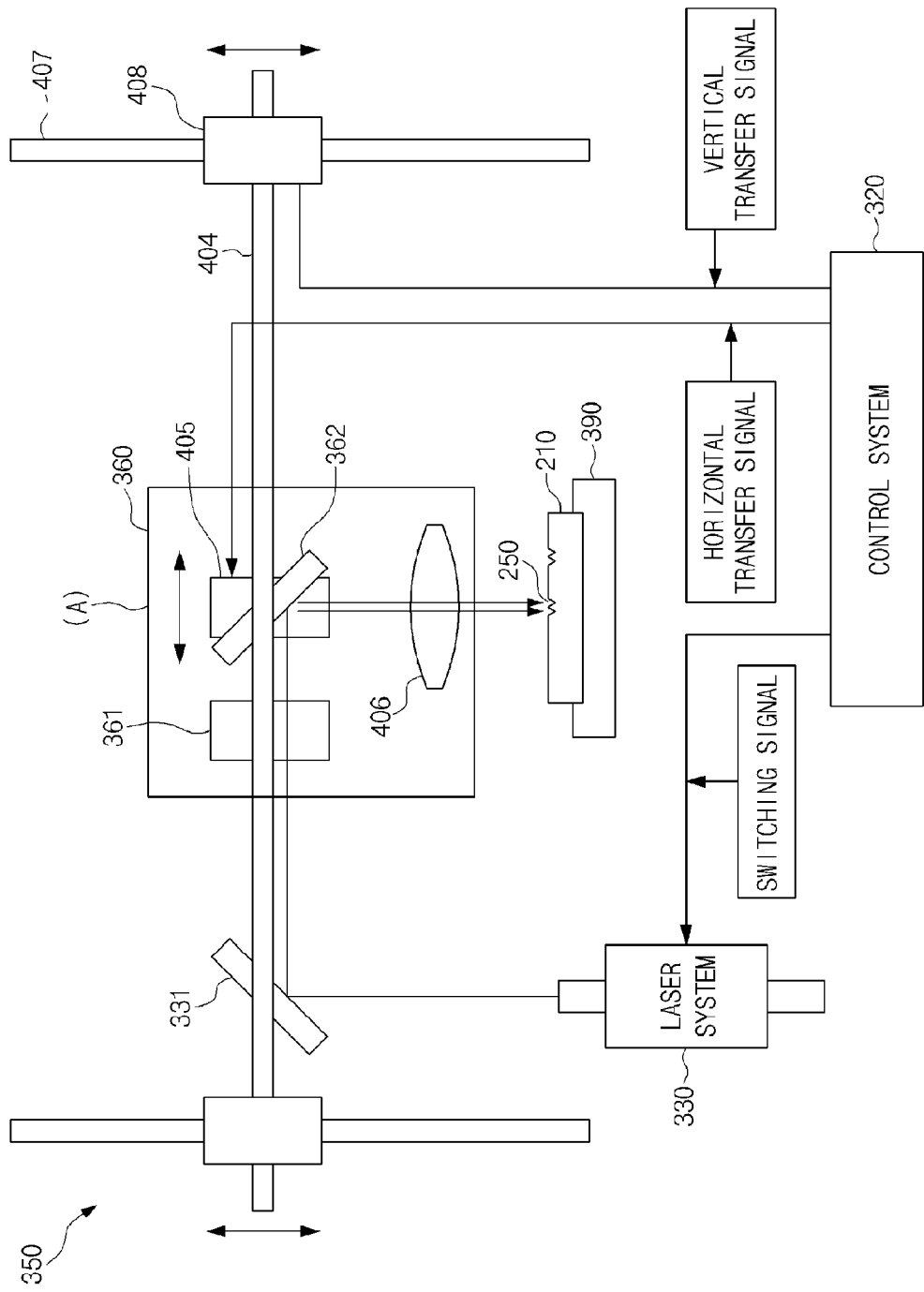
FIG. 4 is a diagram illustrating a construction of a header moving unit according to an example embodiment.

FIG. 4 is a diagram illustrating a construction of a header moving unit 340 according to an example embodiment. FIG. 4 shows only any one of the optical units 362 and 363 of FIG. 3 for the purpose of describing the XY moving unit 250.

Referring to FIG. 4, as aforementioned, a header moving unit 340 includes an XY moving unit 350 mechanically movable in an XY direction and a header unit 360 coupled with the XY moving unit 350 to reflect a laser beam outputted from a laser system 330 installed at one side to a light guide panel 210.

A horizontal guide rail 404 is installed at the XY moving unit 350 to be arranged in an X-axis direction. The horizontal guide rail 404 is coupled with the header unit 360.

A first mirror 331 is installed at the horizontal guide rail 404. The header unit 360 is coupled to be movable along the horizontal guide rail 404.

A horizontal linear motor 405 is installed at the horizontal guide rail 404 such that the header unit 360 is horizontally movable along the horizontal guide rail 404. The horizontal linear motor 405 is a horizontal movement supply source connecting with the header unit 360.

The beam splitter 361 for header split, the mirror unit 362 for angle control of a beam, and the lens unit 406 for collecting light are coupled and horizontally movable with the header unit 360.

A plurality of vertical guide rails 407 are installed at both ends of the horizontal guide rail 404. At least one vertical linear motor 408 is installed at the vertical guide rail 407. The horizontal guide rail 404 is vertically movable along the vertical guide rail 407 by the vertical linear motor 408.

As such, at least one header unit 360 is horizontally movable along the horizontal guide rail 404 by power of the horizontal linear motor 405. The horizontal guide rail 404 is vertically movable along the vertical guide rail 407 by the vertical linear motor 408. At this time, a light output signal delivered to the laser system 330, a horizontal transfer signal delivered to the horizontal linear motor 405, or a vertical transfer signal delivered to the vertical linear motor 408 is transmitted from the control system 320.

Operation of the header moving unit 340 having the above construction is described below in more detail with reference to FIGS. 3 and 4.

A pulse signal synchronized with a movement speed of the header unit 360 that is mechanically transferred by a transfer signal of the control system 320 is delivered to the laser system 330 through the control system 320. A laser beam is outputted from the laser system 330.

The thus outputted laser beam reaches the first mirror 331 fixed at one side of the horizontal guide rail 404. The laser beam reaching the first mirror 361 is vertically reflected from the first mirror 361 and reaches the header unit 360.

The laser beam reaching the header unit 360 is split into laser beams having lower intensities by the beam splitter 361 and the split laser beams are reflected at a desired angle from the mirror unit 362. Then, the reflected laser beams are collected through the lens unit 406 and the collected laser beams reach a scanning surface 250*a* of the light guide panel 210, forming the light guide pattern part 250. At this time, as the header unit 360 moves in a horizontal direction of a process area by the horizontal linear motor 405, a laser beam pair is outputted in a horizontal direction of the light guide panel 210, forming the light guide pattern part 250 being of groove pairs.

Because the vertical guide rail 407 is coupled to both ends of the horizontal guide rail 404, the horizontal guide rail 404 is movable in a vertical direction along the vertical guide rail 407 by power of the vertical linear motor 408 receiving a vertical transfer signal from the control system 320. Therefore, the laser beam is outputted in a vertical direction of the light guide panel 210, thus being capable of forming the light guide pattern part 250.

The light guide panel 250 is processed in a non-contact method as above and thus, serves as a micro lens unit to enable effective scattering and diffusion of light.

In its detailed description, a plurality of the light guide pattern parts 250 being of one or more groove pairs are formed in the light guide panel 210. The light guide pattern part 250 is processed in the non-contact method using a laser beam outputted from a laser device.

The light guide pattern part 250 is formed throughout the entire area of the light guide panel 210 to enable effective diffusion and scattering of light guided to the light guide panel 210 from the light source 240. That is, the light guide pattern part 250 can be of a dot shape of a groove having a predetermined depth, a dotted line shape of an intermittent groove having a predetermined depth, or a straight line shape of a consecutive groove. Also, the light guide pattern part 250 may gradually increase in size or gradually decrease in pitch between light guide patterns to increase a ratio of diffusion and scattering of light as being farther from the light source 240.

Number of grooves of one groove pair is of being consistent with number of split laser beams. That is, if a laser beam is split into two ones, a light guide pattern part is formed with two grooves being one pair. If a laser beam is split into three ones, a light guide pattern part is formed with three grooves being one pair. If a laser beam is split into two ones and a groove has a straight line shape, a light guide pattern part is formed with two straight lines being paired side by side. For example, a distance between grooves is within a range of about 100 to 2000 micrometers.

That is, it is desirable that each groove of the light guide pattern part 250 processed by the laser device has a line width of about 50 to 500 micrometers, and each groove has a depth of about 10 to 400 micrometers. If a laser beam is locally scanned at a partial area of a scanning surface 250*a* of the light guide panel 210, a heating reaction gradually expands more than a width of the laser beam on the scanning surface 250*a*. If this heating reaction deeply expands, a deformation of the light guide panel 210 such as a warp phenomenon takes place.

The warp phenomenon takes place severely at a peripheral part of the light guide panel 210, thus changing an incident angle of a laser beam and making it difficult to form a delicate pattern. In order to prevent this, a warp prevention unit is installed at the light guide panel 210. That is, the vacuum unit 380 is provided at the plate 390 mounting the light guide panel 210 thereon such that the vacuum unit 380 can completely suck one surface of the light guide panel 210 opposite to an area in which the light guide pattern part 250 is formed.

A vacuum passage unit 391 is installed in plural at the vacuum unit 380 to vacuum suck the light guide panel 210 through an internal of the plate 390. The vacuum unit 380 is a pump system such as a mechanical type vacuum pump, a moment transfer type vacuum pump, or an inflow type vacuum pump. The vacuum unit 380 can vacuum suck a lower surface of the light guide panel 210 through the vacuum passage unit 391 by a pumping force of a pump. In a state where the light guide panel 210 is fixed by the warp prevention unit as above, a laser beam is scanned, being capable of forming the light guide pattern part 250. Accordingly, the warp phenomenon caused by local heating of the laser beam may be prevented.

In a method of etching by scanning a laser beam on the light guide panel 210, a surface of the light guide panel 210 of acryl resin is heated by strong energy and thus, acryl resin material is vaporized, thus generating smoke. This smoke causes a laser beam absorption or scattering phenomenon during a scanning process of forming the light guide pattern part 250, thus reducing energy of the laser beam scanned to the light guide panel 210 and interrupting processing of the light guide pattern part 250 into a desired pattern.

In order to remove this phenomenon, an exhaust unit 370 is installed at the light guide panel 210. The exhaust unit 370 sucks and exhausts smoke of acryl resin, which is a raw material of the light guide panel 210, vaporized from the scanning surface 250*a* of the light guide panel 210. Thus, the laser beam absorption or scattering phenomenon can be prevented from being induced owing to the smoke.

Figure 5:
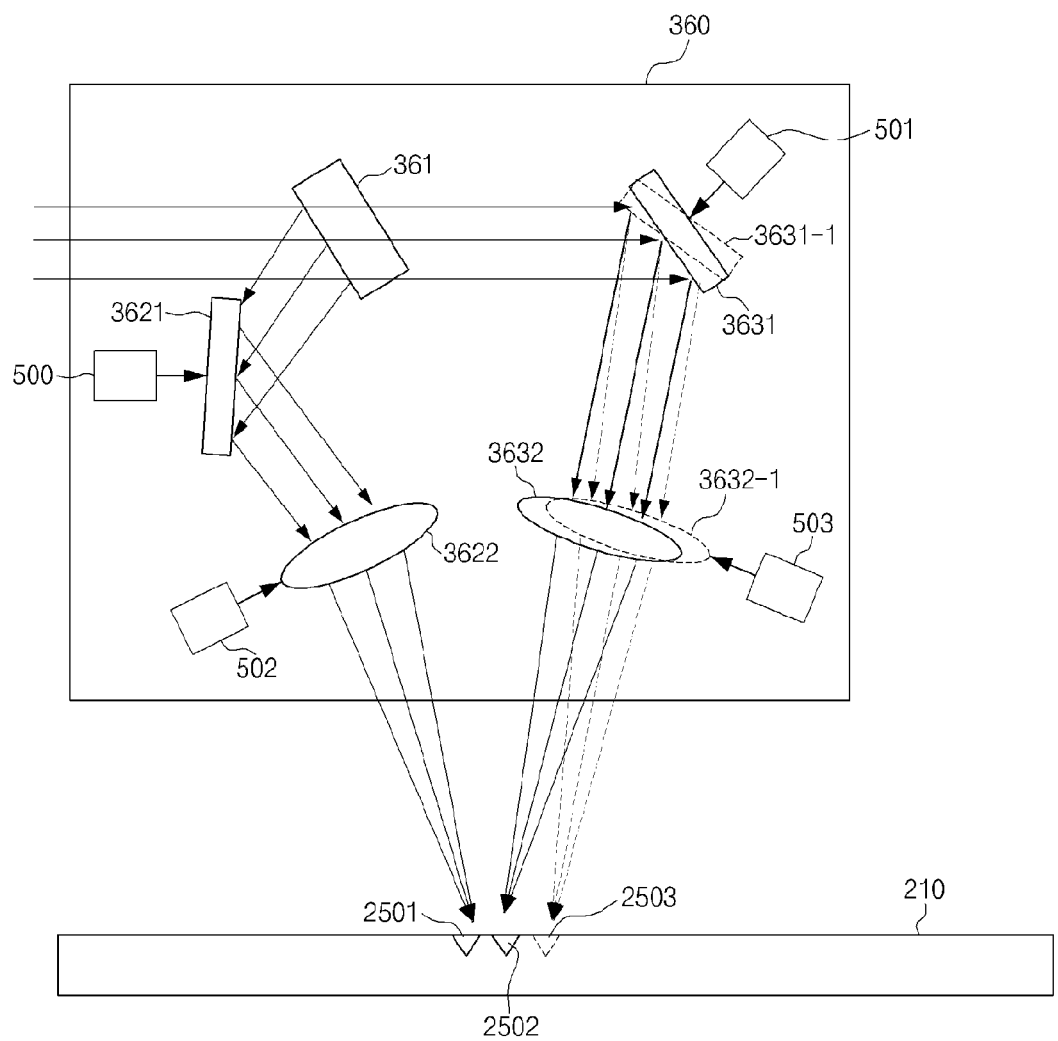
FIG. 5 is a diagram illustrating a construction of a header unit according to an example embodiment.

FIG. 5, a diagram illustrating a construction of a header unit according to an example embodiment, shows addition of optical control units 500, 501, 502, and 503 for controlling mirrors 3621 and 3631 and lenses 3622 and 3632, respectively.

Referring to FIG. 5, respective two laser beams split through a beam splitter 361 each are reflected from the mirrors 3621 and 3631, are collected by the lenses 3622 and 3632, and then are scanned to points 2501 and 2502 of a light guide panel 210. Apart from this, it is shown to add the optical control units 500, 501, 502, and 503 for controlling constituent elements 3621, 3631, 3622, and 3632 of optical units in response to an optical unit control signal delivered from the control system 320 to vary a distance between focuses of laser beams forming a groove pair depending on a position. As shown in FIG. 5, the distance between the focuses of the laser beams can be allowed to vary depending on a position by controlling, by the control unit 501, the mirror 3631 to be in a state such as a reference numeral 3631-1, controlling, by the control unit 503, the lens 3632 to be in a state such as a reference numeral 3632-1, and then collecting a laser beam to a new scanning surface 2503 of the light guide panel 210.

By concentrating the laser beams split by the beam splitter 361 on desired positions using the respective mirrors 3621 and 3631 and lenses 3622 and 3632 as described above, an interval between respective grooves in one groove pair is set to a desired size. At this time, an interval between respective grooves in each groove pair can be controlled to vary depending on a position on the light guide panel by minutely moving the respective mirrors 3621 and 3631 and lenses 3622 and 3632. This is realized by allowing the control system 320 to receive a focus position signal synchronized with a position signal and control positions of the mirrors 3621 and 3631 and the lenses 3622 and 3632 through mechanical motor driving.

Figure 6:
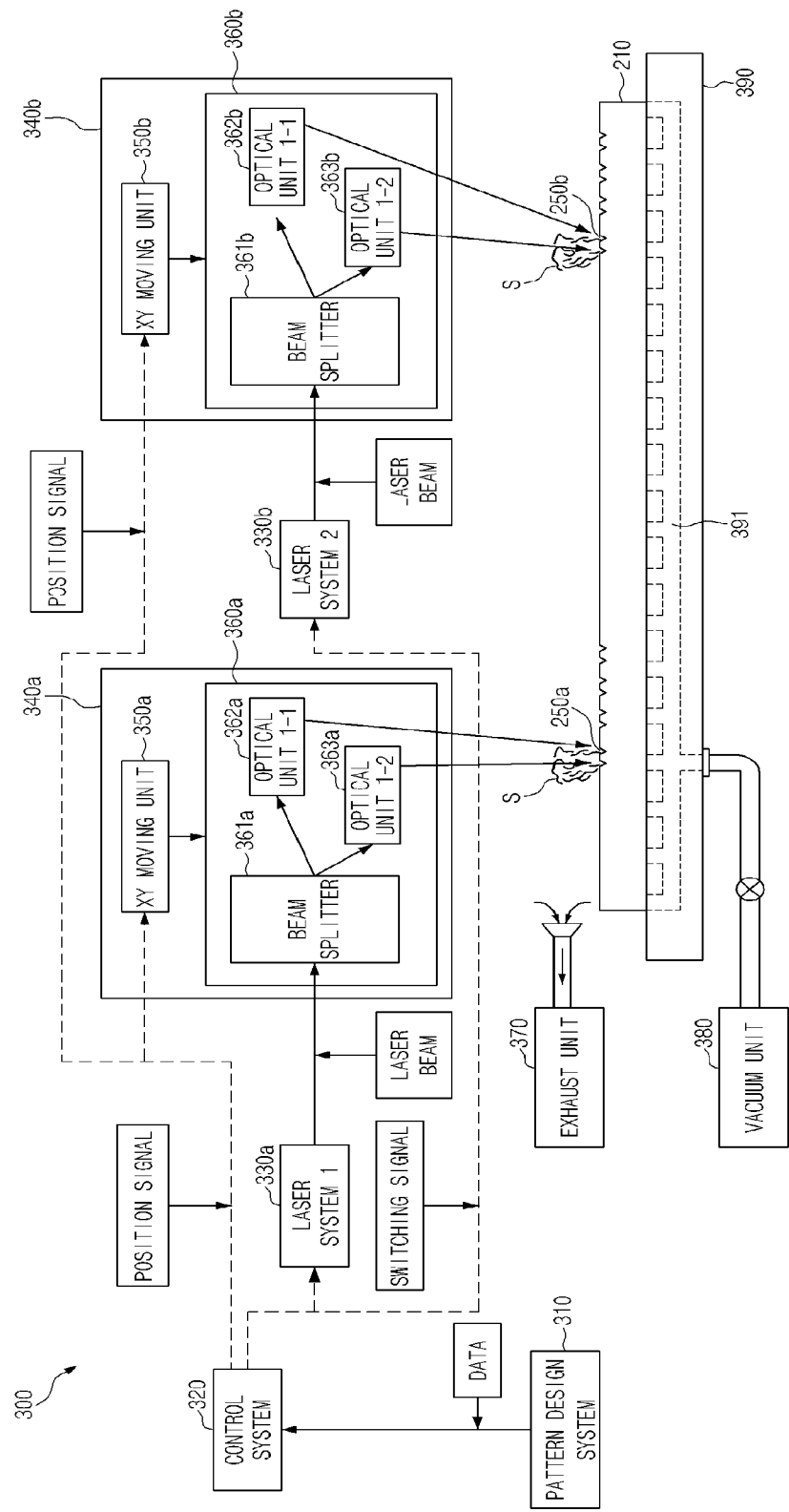
FIG. 6 is a diagram illustrating a construction of a pattern forming apparatus for forming a light guide pattern part on a light guide panel according to a second example embodiment.

FIG. 6 is a diagram illustrating a construction of a pattern forming apparatus for forming a light guide pattern part on a light guide panel according to a second example embodiment. In this case, unlike FIG. 3, two or more laser systems 330a and 330b and header moving units 340a and 340b are provided.

As shown in FIG. 6, a first laser beam emitted from the laser system 1 330a is split into two laser beams through a beam splitter 361a within the first header moving unit 340a. The two split laser beams each are collected to a surface 250a of a light guide panel 210 through optical units 362a and 363a. Likely, a second laser beam emitted from the laser system 2 330b is split into two laser beams through a beam splitter 361b within the second header moving unit 340b. The two split laser beams each are collected to a surface 250b of the light guide panel 210 through optical units 362b and 363b. An operation principle of each of the header moving units 340a and 340b has been previously described in FIG. 3. However, there is a difference that, unlike FIG. 3, the laser systems 330a and 330b and the header moving units 340a and 340b are provided two and the control system 320 divides a position signal corresponding to a coordinate value of each pattern to be formed on the light guide pattern into two or more ones for transmission. In the example embodiment of FIG. 6, two header units 360a and 360b are installed at separate horizontal guide rails. That is, it is characterized that the pattern forming apparatus according to the example embodiment of FIG. 6 is configured to install two horizontal guide rails at a distance on a vertical guide rail and install the header units 360a and 360b on each horizontal guide rail.

A shape of a light guide pattern part manufactured by the aforementioned light guide pattern forming apparatus is described below with reference to FIGS. 7 to 10.

According to a feature, a light guide pattern part having an intermittent shape is formed on a lower surface of a light guide panel throughout the entire area of the light guide panel by a laser process to more effectively scatter and diffuse an incident light. The light guide pattern part being of groove pairs is an aggregate of discontinuous shapes spaced a constant pitch apart. The light guide pattern part is formed in compliance with a predetermined design rule as being far from a light source. In the following, a pitch (P) of a groove pair is an interval between respective groove pairs in a vertical direction with respect to a direction in which the light source is disposed, a length (L) of a groove pair is a size of each groove pair in a horizontal direction with respect to the direction in which the light source is disposed, and a width (W) of a groove pair is an interval between respective groove pairs in the horizontal direction with respect to the direction in which the light source is disposed.

Figure 7:
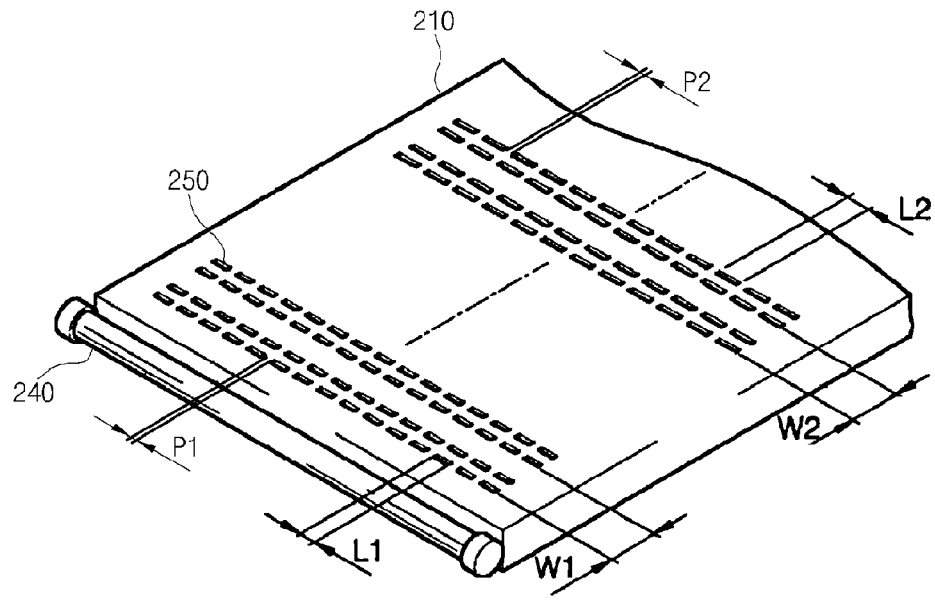
FIG. 7 is a diagram illustrating a shape of a light guide pattern part according to a first example embodiment.

FIG. 7 is a diagram illustrating a shape of a light guide pattern part according to a first example embodiment.

Referring to FIG. 7, a light guide pattern part 250 is formed on one surface of a light guide pattern 210. The light guide pattern part 250 is of a groove shape having a plurality of discontinuous dotted-line-pair forms. Each groove pair is spaced a constant pitch apart. The light guide pattern part 250 is formed on a scanning surface of the light guide panel 210 in compliance with a predetermined design rule based on a relative position relationship with a light source 240.

That is, the light source 240 is installed at one sidewall of the light guide panel 210. In the light guide pattern part 250, a plurality of grooves are intermittently formed to have shorter lengths (L1) in a lengthwise direction of the light source 240 at a peripheral part of the light guide panel 210 close to the light source 240 than at other areas of the light guide panel 210.

On the contrary, as being farther from the light source 240, a length (L2) of a groove pair on the light guide panel 210 increases more than the length (L1) of a groove pair in an area of the light guide panel 210 close to the light source 240.

A pitch (P1) between groove pairs at the peripheral part of the light guide panel 210 close to the light source 240 is substantially the same as a pitch (P2) between groove pairs of the light guide panel 210 farthest from the light source 240.

If the light source 240 is installed at each of both sidewalls of the light guide panel 210, a central part of the light guide panel 210 is a part farthest from the light sources 240. Thus, each groove pair of the light guide pattern part 250 in the central part of the light guide panel 210 is formed to have the longest length throughout the entire area of the light guide panel 210. On the contrary, a groove of the light guide pattern part 250 at the peripheral part of the light guide panel 210 close to the light source 240 is formed to have the shortest length.

As such, each groove of the light guide pattern part 250 is formed in the light guide panel 210 to be variable and gradually increase as being far from the light source 240. Each groove is formed to have a discontinuous dotted line shape in a direction in which the light source 240 is installed.

Accordingly, though being far from the light source 240 installed at one sidewall of the light guide panel 210, a length of a groove of an intermittent straight line shape of the light guide pattern part 250 gradually increases so that an amount of guided light increases, thus being capable of preventing brightness from reducing as being far from the light source 240. Accordingly, a uniform brightness can be obtained throughout the entire area of the light guide panel 210.

The light guide pattern part 250 being of the grooves having the intermittent straight line shapes can be easily formed by mechanically driving the apparatus for forming the light guide pattern part.

That is, the header unit 360 movable in a lengthwise direction in which the light source 240 is installed that is an X-axis direction of the light guide panel 210 moves at a constant speed, reflecting a laser beam outputted from a laser system 330 to the light guide panel 210, thus making it possible to form each groove of the light guide pattern part 250 in a desired position.

At this time, each groove formed in the light guide panel 210 has a different length. This can be easily processed by controlling an electrical switching signal for a position signal corresponding to a coordinate value of each pattern inputted to the control system 320, not by a mechanical control of the header unit 360.

As such, in association with that the header unit 360 moves in a horizontal direction of the light guide panel 210, each groove of the light guide pattern part 250 formed on the light guide panel 210 has the intermittent straight line shape and therefore, is possible to be formed without a dark line or a bright line.

Figure 8:
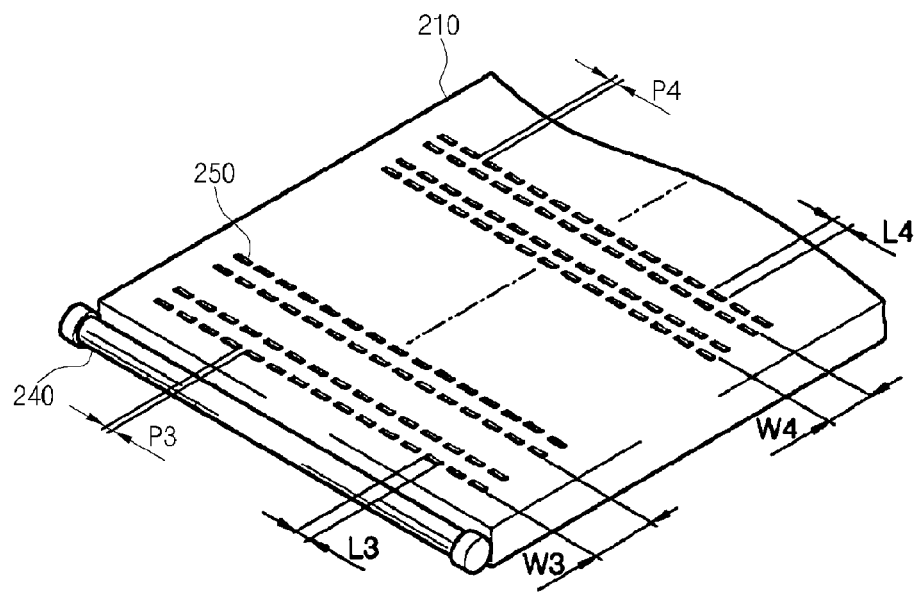
FIG. 8 is a diagram illustrating a shape of a light guide pattern part according to a second example embodiment.

FIG. 8 is a diagram illustrating a shape of a light guide pattern part according to a second example embodiment.

Referring to FIG. 8, a light guide pattern part 250 is formed on a light guide panel 210 to have a groove of an intermittent straight line shape on a scanning surface. Each groove of the light guide pattern part 250 is formed on the scanning surface of the light guide panel 210 in compliance with a predetermined design rule based on a relative position relationship with a light source 240 installed at one sidewall of the light guide panel 210.

Each groove of the light guide pattern part 25 is formed varying its interval over a process area of the light guide panel 210. That is, a pitch (P3) between respective grooves at a peripheral part of the light guide panel 210 close to the light source 240 is formed to be wider than a pitch (P4) between respective grooves at a central part that is relatively far from the light source 240.

A pitch between respective grooves is formed to gradually decrease as going to the central part of the light guide panel 210 from an area close to the light source 240. A length (L3) of a groove at the peripheral part of the light guide panel 210 may be substantially the same as a length (L4) of a groove at the central part.

As such, the pitch between the respective grooves of the light guide pattern part 250 is formed to vary and gradually decrease as being far from the light source 240. Each groove is formed to have an intermittent straight line shape in a direction in which the light source 240 is installed.

Accordingly, though being far from the light source 240, an interval between grooves of the light guide pattern part 250 gets denser, so an amount of guided light increases, thus being able to prevent a reduction of brightness. Undoubtedly, each groove of the light guide pattern part 250 is processed by a system for forming the light guide pattern part.

Figure 9:
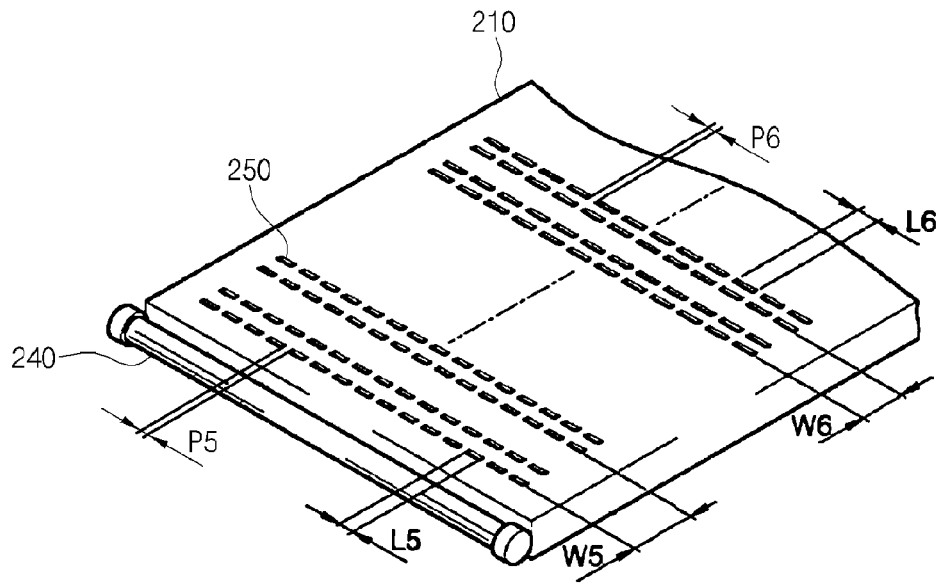
FIG. 9 is a diagram illustrating a shape of a light guide pattern part according to a third example embodiment.

FIG. 9 is a diagram illustrating a shape of a light guide pattern part according to a third example embodiment.

Referring to FIG. 9, a light guide pattern part 250 is formed on a light guide panel 210 to have a groove of an intermittent straight line shape by a laser beam. Each groove of the light guide pattern part 250 differs in length or differs in pitch depending on a distance from a light source 240.

That is, a length (L5) of each groove at a peripheral part of the light guide panel 210 close to the light source 240 installed at one sidewall of the light guide panel 210 is formed to be shorter than a length (L6) of each groove at a central part of the light guide panel 210 relatively far from the light source 240. On the contrary, a pitch (P5) between respective grooves at the peripheral part of the light guide panel 210 is formed to be wider than a pitch (P6) between respective grooves at the central part of the light guide panel 210.

As going to the central part of the light guide panel 210 from the peripheral part of the light guide panel 210 close to the light source 240, a length of each groove is formed to gradually increase and a pitch between respective grooves is formed to gradually decrease.

As such, the length of each groove of the light guide pattern part 250 and the pitch between the respective grooves are formed to vary in the light guide panel 210 as being far from the light source 240. Each groove is formed to have an intermittent straight line shape in a direction in which the light source 240 is installed.

It is possible to process the light guide pattern part 250 of the above shape into a desired pattern by a time control while a header unit 360 of a system for forming the light guide pattern part moves at a constant speed in a horizontal direction on a scanning surface of the light guide panel 210, receiving an electrical signal for a length of each groove or a pitch between respective grooves.

Figure 10:
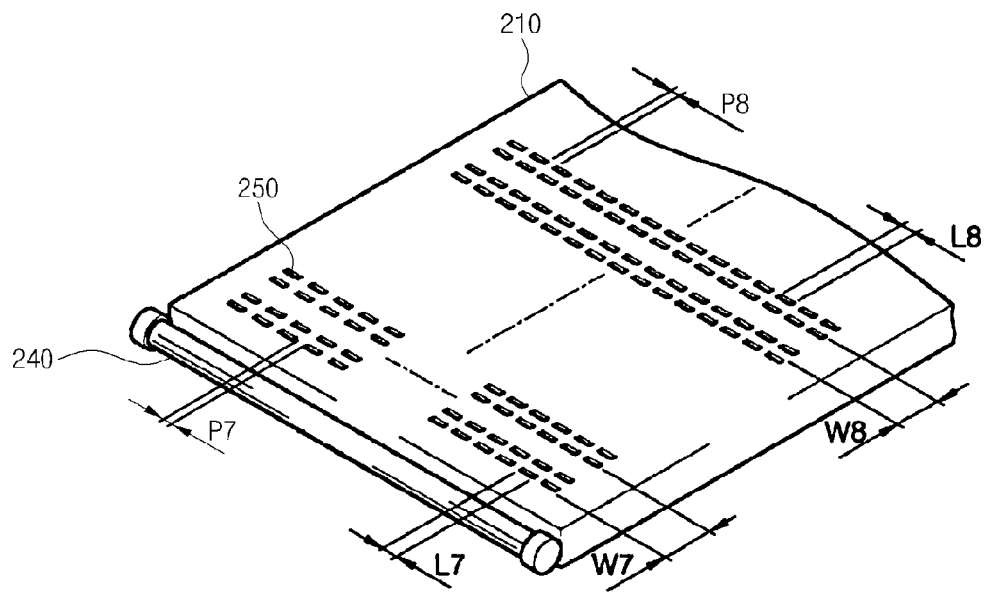
FIG. 10 is a diagram illustrating a shape of a light guide pattern part according to a fourth example embodiment.

FIG. 10 is a diagram illustrating a shape of a light guide pattern part according to a fourth example embodiment.

Referring to FIG. 10, a light guide pattern part 250 is formed on one surface of a light guide panel 210 to have a groove of an intermittent straight line shape. Each groove of the light guide pattern part 250 is formed on a scanning surface of the light guide panel 210 in compliance with a constant design rule based on a relative position relationship with the light source 240 installed at one sidewall of the light guide panel 210.

Each groove of the light guide pattern part 250 is formed to vary each interval over a process area of the light guide panel 210. That is, a width (W7) between respective grooves at a peripheral part of the light guide panel 210 close to the light source 240 is formed to be greater than a width (W8) between respective grooves at a central part relatively far from the light source 240.

As going to the central part of the light guide panel 210 from the peripheral part of the light guide panel 210 close to the light source 240, a width between respective grooves is formed to gradually decrease.

A length (L7) of each groove and a pitch (P7) between respective grooves at the peripheral part of the light guide panel 210 are substantially the same as a length (L8) of each groove and a pitch (P8) between the respective grooves at the central part. Undoubtedly, each groove of the light guide pattern part 250 is processed by a system for forming the aforementioned light guide pattern part.

In the aforementioned light guide panel 210, as being far from the light source 240, a width between respective grooves of the light guide pattern part 250 is formed to vary and gradually decrease. Each groove is formed to have an intermittent straight line shape in a direction in which the light source 240 is installed.

Thus, though being far from the light source 240, a width between grooves of the light guide pattern part 250 gets denser, so an amount of guided light increases, thus being able to prevent a reduction of brightness. Undoubtedly, each groove of the light guide pattern part 250 is processed by the aforementioned laser system.

Figure 11:
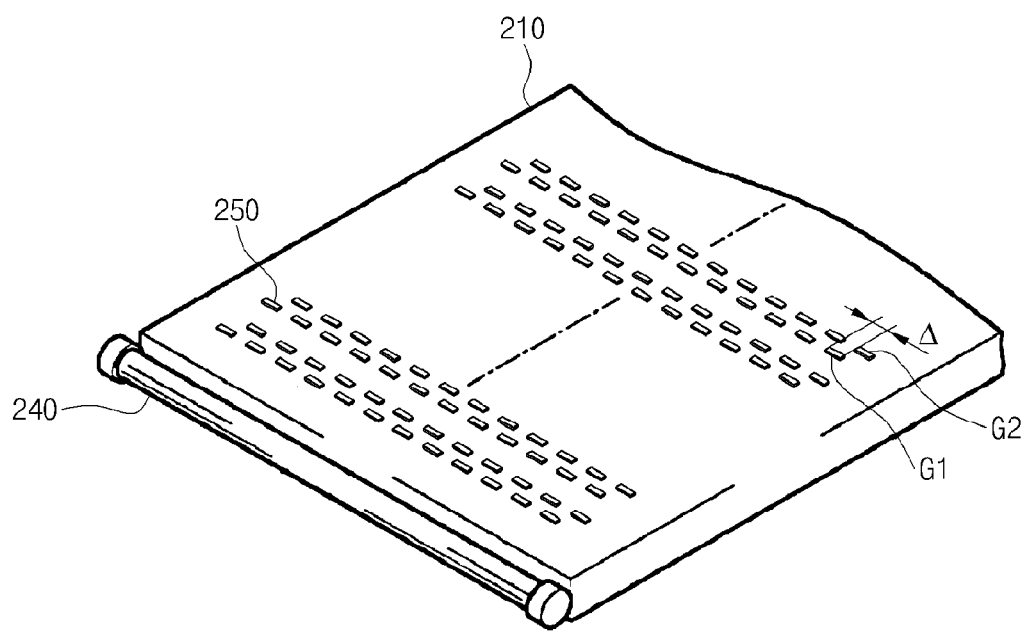
FIG. 11 is a diagram illustrating a shape of a light guide pattern part according to a fifth example embodiment.

FIG. 11 is a diagram illustrating a shape of a light guide pattern part according to a fifth example embodiment. The light guide pattern part is of a type in which a phase difference between respective grooves is about 90 degrees.

Referring to FIG. 11, a light guide pattern part 250 may be formed to have a phase difference (Δ) from 0 to 90 degrees between respective grooves (G1 and G2). This does not intend to limit a shape of the light guide pattern part 250 and any structure being able to reflect, diffuse, and scatter to the front is possible. In the aforementioned example embodiment, the light guide pattern part 250 is combined with a structure of varying a length of each groove, a width between respective grooves, or a pitch between respective grooves as being far from the light source 240 to control a scattering characteristic of an amount of guided light, so a uniform brightness may be obtained.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A pattern forming apparatus for forming a plurality of patterned light guide pattern parts on a light guide panel, the apparatus comprising:
 a pattern design system configured to receive an input of data on a pattern to be formed in a light guide panel;
 a control system configured to connect with the pattern design system and configured to transmit a position signal corresponding to a coordinate value of each pattern to be formed in the light guide panel;
a header moving unit comprising:
an XY moving unit configured to mechanically move up/down and left/right in response to the position signal received from the control system; and
a header unit coupled with the XY moving unit and configured to reflect a laser beam scanned from a laser system to the light guide panel;
the laser system configured to output a laser beam by a pulse signal synchronized with an operation of the header moving unit;
one or more beam splitters positioned within the header unit and configured to split a laser beam, which is outputted from the laser system and passes through the header moving unit, into two or more laser beams; and
two or more optical units positioned within the header unit and configured to reflect and collect each of the two or more laser beams split in the beam splitters,
an optical control unit configured to independently control each of the two or more optical units according to an optical unit control signal delivered from the control system to vary a distance between focuses of the laser beams forming a groove pair based on a process position on the light guide panel,
wherein the two or more laser beams simultaneously outputted from the two or more optical units each are collected as multi-focus beams at a distance on a process surface of the light guide panel.

2. A pattern forming apparatus for forming a plurality of patterned light guide pattern parts on a light guide panel, the apparatus comprising:
a pattern design system configured to receive an input of data on a pattern to be formed in a light guide panel;
a control system configured to connect with the pattern design system and to divide a position signal corresponding to a coordinate value of each pattern to be formed in the light guide panel into two or more signals for transmission;
two or more header moving units comprising:
XY moving units each configured to mechanically move up/down and left/right in response to the position signal received from the control system; and
header units each coupled with the XY moving units and configured to reflect laser beams scanned from two or more laser systems to the light guide panel;
the two or more laser systems configured to output laser beams by pulse signals synchronized with operations of the header moving units;
beam splitters each positioned within a header unit of the two or more header moving units, the beam splitters being configured to split the laser beams, which are outputted from the laser systems and pass through the header moving units, into two or more laser beams; and
two or more optical units each positioned within a header unit of the two or more header moving units, the two or more optical units being configured to reflect and to collect the two or more laser beams split by the beam splitters; and
an optical control unit configured to independently control each of the two or more optical units according to an optical unit control signal delivered from the control system to vary a distance between focuses of the laser beams forming a groove pair based on a process position on the light guide panel,
wherein the four or more laser beams each simultaneously outputted from the two or more optical units each are collected as multi-focus beams at a distance on a process surface of the light guide panel.

3. The apparatus of claim 1, wherein the light guide pattern part formed in the light guide panel is of a combination of one or more of:
grooves of a dot pair being of two or more dots;
a dotted line pair being of two or more dotted lines; and
a straight line pair being of two or more straight lines.

4. The apparatus of claim 1, further comprising a vacuum unit installed on a lower surface of the light guide panel and configured to prevent the light guide panel from being warped by local heating of the laser beam.

5. The apparatus of claim 1, further comprising an exhaust unit installed on an upper surface of the light guide panel and configured to remove smoke generated while the light guide pattern part is formed in the light guide panel.

6. The apparatus of claim 3, wherein the light guide pattern part is formed such that a length of each groove pair gradually increases as the light guide pattern part is further from the light source.

7. The apparatus of claim 3, wherein the light guide pattern part is formed such that a pitch between respective groove pairs gradually decreases as the light guide pattern part is further from the light source.

8. The apparatus of claim 3, wherein the light guide pattern part is formed such that, as the light guide pattern part is further from the light source, a length of each groove pair gradually increases and a pitch between respective groove pairs gradually decreases.

9. The apparatus of claim 3, wherein the light guide pattern part is formed such that a width between respective groove pairs gradually decreases as the light guide pattern part is further from the light source.

10. The apparatus of claim 3, wherein the light guide pattern part is formed in combination such that, as the light guide pattern part is further from the light source, a length of each groove pair gradually increases, a pitch between respective groove pairs gradually decreases, or a width between respective groove pairs gradually decreases.

* * * * *